(12) United States Patent
Erickson et al.

(10) Patent No.: US 7,138,031 B2
(45) Date of Patent: Nov. 21, 2006

(54) MANDREL AND METHOD FOR MANUFACTURING COMPOSITE STRUCTURES

(75) Inventors: Dave G. Erickson, Seattle, WA (US); Panagiotis E. George, Sumner, WA (US); Ryan C. Mortensen, Federal Way, WA (US); Stuart A. Smith, Kent, WA (US)

(73) Assignee: The Boeing Company, Chicago, IL (US)

( * ) Notice: Subject to any disclaimer, the term of this patent is extended or adjusted under 35 U.S.C. 154(b) by 406 days.

(21) Appl. No.: 10/657,969

(22) Filed: Sep. 9, 2003

(65) Prior Publication Data

US 2005/0051262 A1    Mar. 10, 2005

(51) Int. Cl.
*B32B 37/10* (2006.01)
(52) U.S. Cl. .................. 156/285; 156/286; 156/381
(58) Field of Classification Search ............... 156/169, 156/172, 173, 175, 425, 285, 286, 381, 382
See application file for complete search history.

(56) References Cited

U.S. PATENT DOCUMENTS

| | | | |
|---|---|---|---|
| 3,282,757 A * | 11/1966 | Brussee ..................... 156/172 |
| 4,353,947 A | 10/1982 | Northcutt | |
| 4,622,091 A | 11/1986 | Letterman | |
| 4,854,988 A * | 8/1989 | Voirol et al. ................ 156/175 |
| 5,227,208 A * | 7/1993 | Thongs, Jr. ................. 428/34.7 |
| 5,284,702 A | 2/1994 | Umemoto et al. | |
| 5,604,010 A | 2/1997 | Hartz et al. | |
| 5,685,940 A | 11/1997 | Hopkins et al. | |
| 5,746,553 A * | 5/1998 | Engwall .................... 409/132 |
| 5,895,699 A | 4/1999 | Corbett et al. | |
| 5,897,739 A * | 4/1999 | Forster et al. .............. 156/285 |
| 6,012,883 A * | 1/2000 | Engwall et al. ............. 409/132 |
| 6,168,358 B1 * | 1/2001 | Engwall et al. ............. 409/219 |

FOREIGN PATENT DOCUMENTS

JP     57-116635 A  *  7/1982

* cited by examiner

*Primary Examiner*—Jeff H. Aftergut
(74) *Attorney, Agent, or Firm*—Alston & Bird LLP

(57) ABSTRACT

An apparatus and method for retaining composite structures, such as composite honeycomb structures, during manufacture are provided. The composite structure is cured on a mandrel that defines a layup surface with a grip feature. The grip feature is configured to engage the composite structure during manufacture and retain the structure in a predetermined configuration. A film adhesive can be provided between the grip feature and a tiedown ply that extends from the composite structure.

35 Claims, 3 Drawing Sheets

MANDREL AND METHOD FOR MANUFACTURING COMPOSITE STRUCTURES

FEDERALLY SPONSORED RESEARCH OR DEVELOPMENT

This invention was made with Government support under contract number N00140-95-2-J044 awarded by the U.S. Navy. The government has certain rights in this invention.

BACKGROUND OF THE INVENTION

1) Field of the Invention

The present invention relates to the manufacture of composite structures and, in particular, to the securing of composite structures such as honeycomb sandwich structures to a mandrel to prevent distortion during manufacture.

2) Description of Related Art

Composite structures are manufactured for use in a variety of structural applications where the structures provide high stiffness-to-weight and strength-to-weight ratios. For example, a honeycomb core sandwich panel has composite laminate skins that are co-cured with adhesives to opposite sides of a lightweight honeycomb core that can be formed of paper, metal, and the like. Such structures are described in U.S. Pat. Nos. 5,284,702; 4,622,091; and 4,353,947, each of which is incorporated herein in its entirety by reference.

One problem encountered during the manufacture of composite structures relates to the flow of resin from the laminate skin to the core of the structure. Resin is typically provided on or in the skins, and the resin is cured in an autoclave during the co-cure operation. For example, the skins can be formed of a pre-impregnated material, i.e., a prepreg, such as a sheet of a matrix material with a resin disposed therein. As described in U.S. Pat. No. 5,604,010 which is incorporated herein in its entirety by reference, the resin from the skins can flow into the core of the structure during manufacture, thereby reducing the amount of resin in the laminates, and reducing the strength of the laminates. The resin that flows into the core does not add significantly to the strength of the structure. Thus, a heavier panel must be used to achieve a specific desired strength.

Scrim-supported barrier films are described in U.S. Pat. No. 5,604,010 between the fiber-reinforced resin composite laminates and the honeycomb core for preventing the flow of the resin into the core. In addition, U.S. Pat. Nos. 5,685,940 and 5,895,699 describe the use of tiedown plies to reduce slipping of the barrier film relative to the core during curing, and both patents are incorporated herein in their entirety by reference. The edges of the tiedown plies can be adhered to one another using a film adhesive with a relatively low cure temperature so that the film adhesive melts and cures at a lower temperature than the resin in the laminates. Thus, the film adhesive can be used to bond the tiedown plies together before the autoclave pressure and temperature are increased during curing of the laminates, thereby retaining the structure in a desired configuration during curing and reducing the likelihood of the core being crushed between the laminates.

The edges of the tiedown plies are also taped to a mandrel on which the composite structure is disposed to further retain the composite structure to its desired configuration. However, the use of the tape adds to the time and cost of the manufacturing process. Further, in order to sufficiently secure the tiedown plies, each tiedown ply extends beyond the desired size of the structure, with successively higher tiedown plies in a stacked structure extending outwardly beyond each of the lower plies so that each ply can be taped to the mandrel. This requires additional material for the tiedown plies, and requires additional space on the mandrel for securing each of the tiedown plies.

Alternatively, grit strips, also referred to as "grip strips," can be provided on the mandrel to increase the friction between the mandrel and the structure and retain the structure in the desired configuration. The grit strips can be formed of a gritty layer, similar to sandpaper, that is secured on the mandrel, or the grit strips can be formed of metal strips that are roughed by forming a plurality of perforations therethrough. However, the grit strips also add to the manufacturing cost. Further, the grit strips can be difficult to clean after use, requiring additional time for cleaning or replacement.

Thus, there exists a need for an improved mandrel and method for retaining structural members during manufacture. The mandrel and method should be applicable to composite structures such as composite honeycomb structures, and should retain the structure to prevent changes in the configuration of the structure, for example, to prevent core crush. Further, the improvement should preferably not require that the mandrel be significantly larger than the composite structure.

BRIEF SUMMARY OF THE INVENTION

The present invention provides a mandrel and a method for retaining composite structures, such as composite honeycomb structures, during manufacture. The mandrel defines a layup surface with a grip feature, such as a groove or step, that is configured to engage the composite structure during manufacture and retain the structure in a predetermined configuration. Each of the plies of the composite structure can be secured to the mandrel proximate to the grip feature such that the mandrel need not be significantly larger than the composite structure. Thus, mandrels according to the present invention can be smaller than conventional devices for forming a composite structure of a given size. The smaller relative size of the mandrel of the present invention can reduce the cost of the mandrel. Further, the smaller size of the mandrel can have a relatively lesser thermal mass, thereby saving energy and time during cure cycles.

According to one embodiment of the present invention, the mandrel defines an inner portion generally corresponding to a desired contour of the composite structure. The grip feature extends at least partially around the inner portion, for example, to define a boundary of the inner portion having a shape generally corresponding to the desired shape of the composite structure. The grip feature can define a retaining surface generally perpendicular to the layup surface and an edge between the layup surface and the retaining surface. The retaining surface and the edge are configured to engage the composite structure. For example, the grip feature can be a groove disposed in the layup surface defining a boundary between the inner portion and an outer peripheral portion of the layup surface. Alternatively, the grip feature can define a bottom that extends from the retaining surface to a periphery of the mandrel.

According to one method of the present invention, a mandrel defining a layup surface for receiving the composite structure is provided. A composite preform is assembled on the layup surface with at least one resinous laminate and at least two tiedown plies. At least one of the tiedown plies is adhered to the mandrel with the film adhesive, which is applied at the grip feature so that the tiedown ply is engaged by the grip feature and the grip feature retains the composite structure in a predetermined configuration.

For example, the laminate can include a bismaleimide (BMI) matrix resin. A barrier film of a bondable grade polyimide can also be provided adjacent the laminate, with an adhesive between the barrier film and a honeycomb core of the preform. Further, a film adhesive layer can be provided between the barrier film and the laminate, and/or a supporting scrim can be provided between the barrier film adhesive and the core to prevent sagging of the barrier film into the core cells. One or more of the tiedown plies can be placed between the adhesive and core so that the tiedown ply is in contact with the core.

The film adhesive is characterized by a cure temperature lower than a cure temperature of the resin of the laminate. Thus, the composite preform can be heated to a first temperature between the cure temperature of the film adhesive and the cure temperature of the resin in the laminate, and subsequently to a temperature at least as high as the cure temperature of the resin so that the film adhesive is cured before the resin is melted. After the resin in the laminate is cured, the preform can be trimmed along a trim line inward of the grip feature to form the composite structure having a predetermined shape.

BRIEF DESCRIPTION OF THE SEVERAL VIEWS OF THE DRAWINGS

Figure 1:
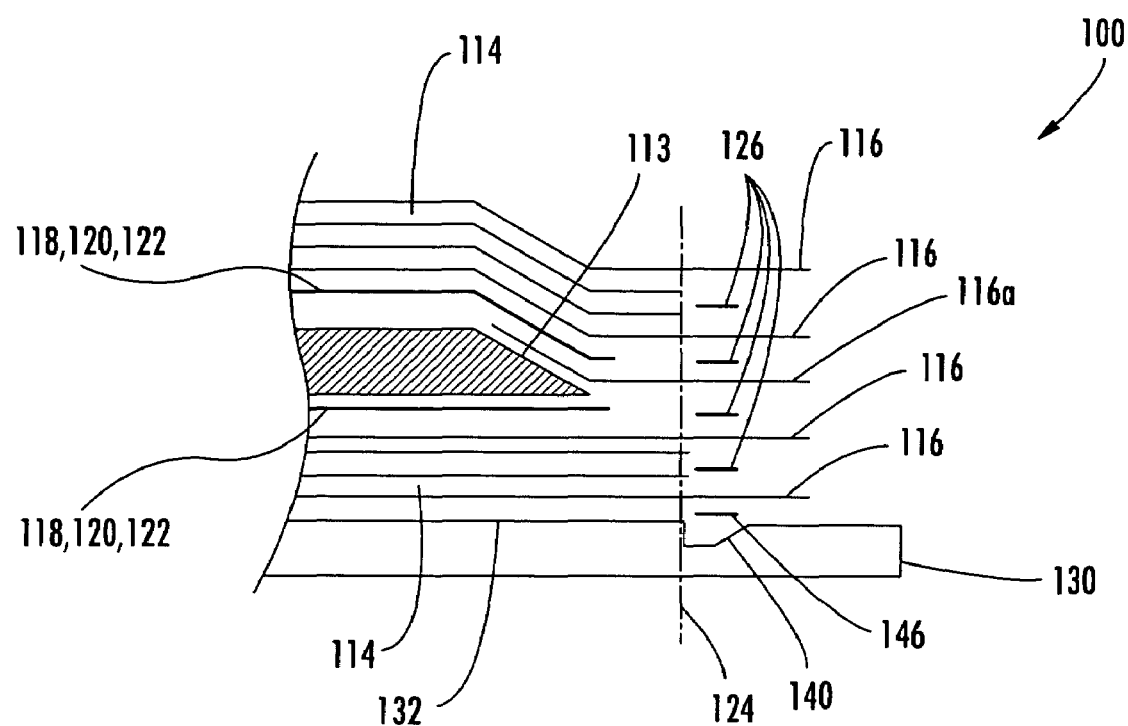
Figure 1A:
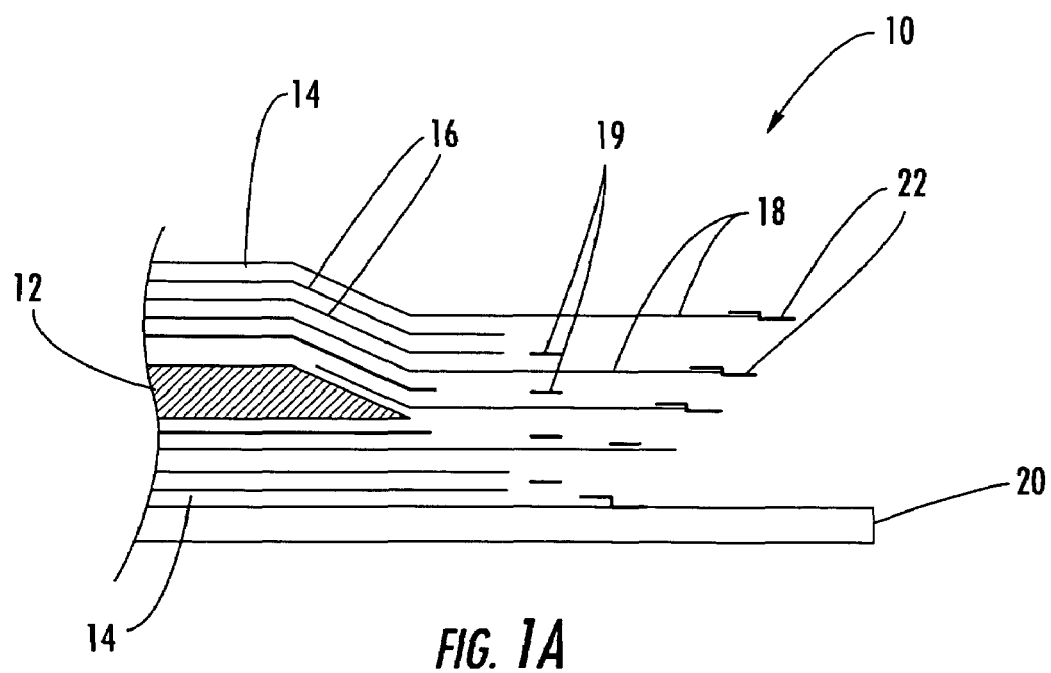
Figure 2:
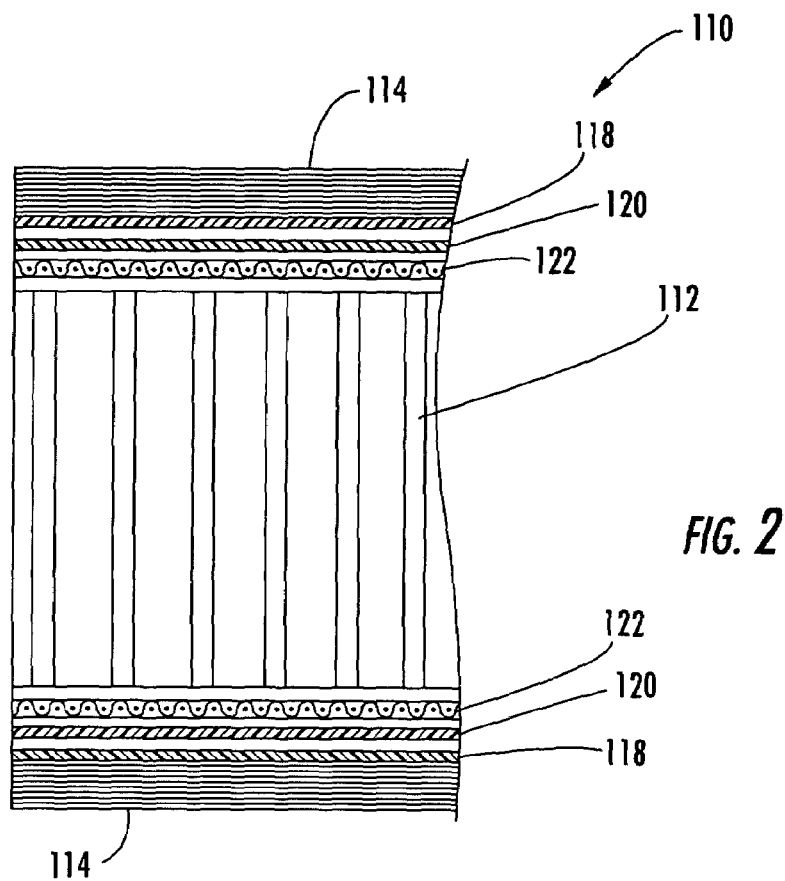
Figure 3:
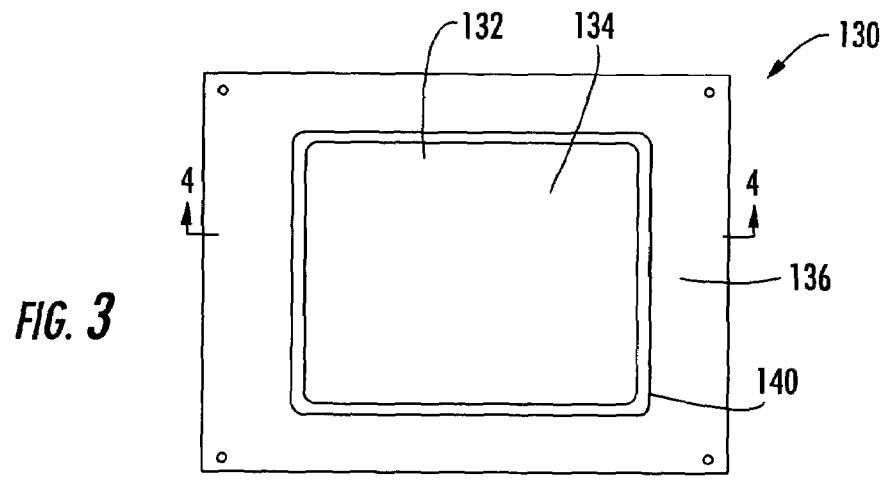
Figure 4:
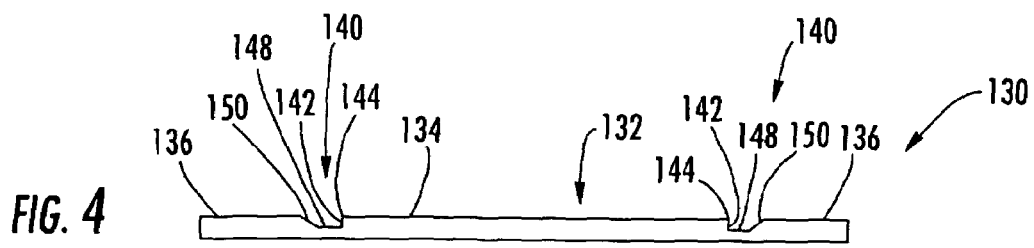
Figure 5:
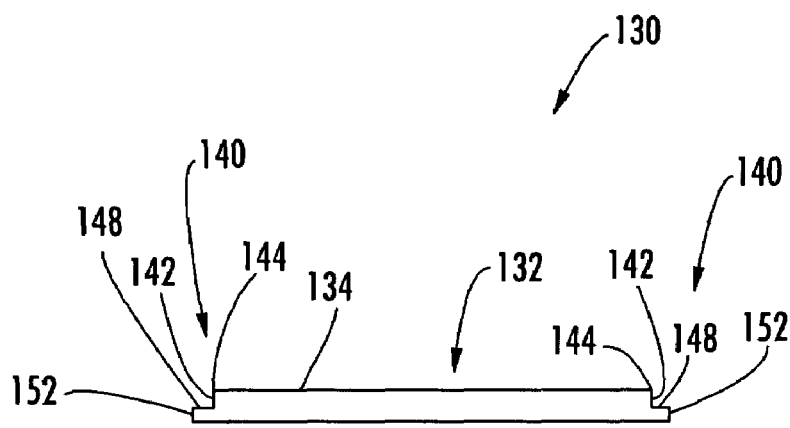
Figure 6:
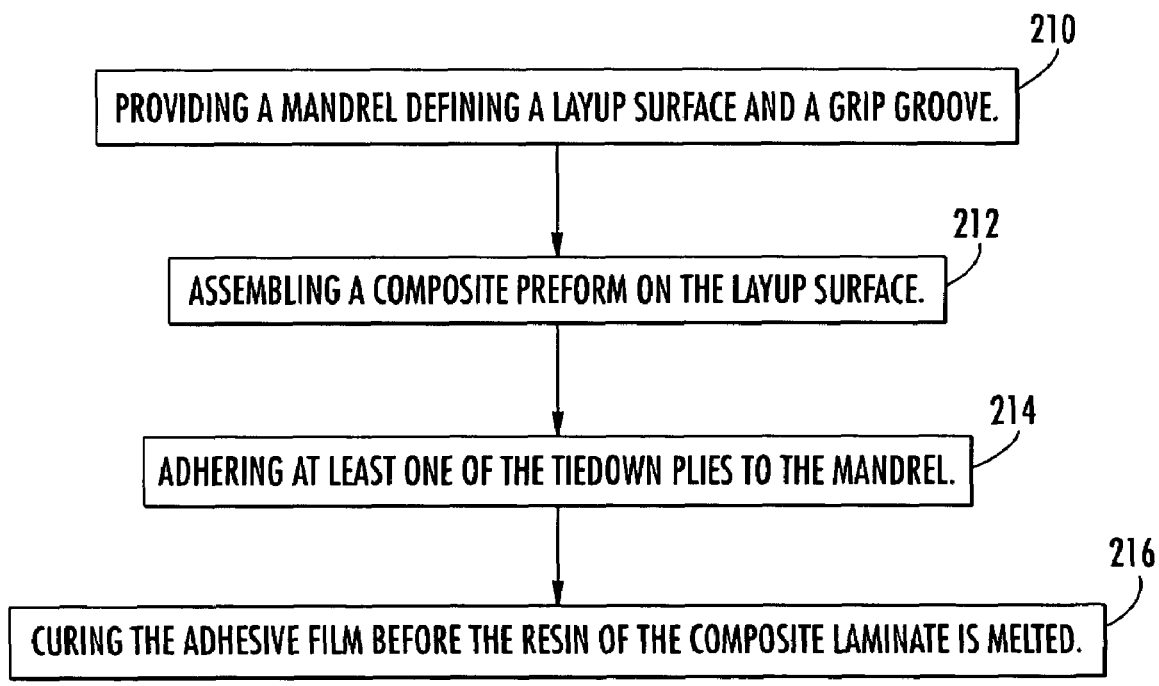

Having thus described the invention in general terms, reference will now be made to the accompanying drawings, which are not necessarily drawn to scale, and wherein:

FIG. 1 is a partial section view illustrating a mandrel with a preform for forming a composite structure thereon according to one embodiment of the present invention;

FIG. 1A is a partial section view illustrating a composite structure disposed on a planar mandrel;

FIG. 2 is a partial section view illustrating a composite structure formed according to one embodiment of the present invention;

FIG. 3 is a plan view illustrating the mandrel of FIG. 1;

FIG. 4 is a section view illustrating the mandrel of FIG. 1 as seen along line 4—4 of FIG. 3;

FIG. 5 is a section view illustrating a mandrel according to another embodiment of the present invention; and FIG. 6 is a block diagram illustrating the operations for forming a composite structure according to one embodiment of the present invention.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

FIG. 1A illustrates a composite structure 10 during a conventional manufacture process known in the art. As shown, the structure 10 is formed of a core 12 that is sandwiched between laminar skins 14 disposed on a planar mandrel 20. The laminar skins 14 are formed of a plurality of layers of plies 16, 18, with some of the plies, referred to as tiedown plies 18, extending outward from the structure 10. The plies 16, 18 are resin-impregnated laminar sheets. For purposes of illustrative clarity, the thickness of the laminar skins 14 is exaggerated, with space shown between the plies 16, 18, though in practice the plies 16, 18 are disposed substantially against one another. Each of the tiedown plies 18 is taped to the mandrel 20, such as by using 2-inch wide pieces 22 of Kapton® tape, a registered trademark of E. I. Du Pont De Nemours and Company. Advantageously, each successive tiedown ply 18 extends to a successively greater length than the lower tiedown plies 18, i.e., the plies 18 closer to the mandrel 20. Thus, each tiedown ply 18 extends beyond the edges of the lower tiedown plies 18 so that the tape adheres each tiedown ply 18 directly to the mandrel 20. Further, an epoxy film adhesive 19 disposed between the adjacent tiedown plies 18 is configured to connect the plies 18. The film adhesive 19 can be configured to cure at a temperature less than the cure temperature of the resin in the laminate skins 14. During manufacture, the structure 10 is heated to a first temperature to cure the film adhesive 19 between the tiedown plies 18 without melting the resin in the laminate skins 14. Then, with the film adhesive 19 cured and connecting the tiedown plies 18, the structure 10 is heated to a second, higher temperature, at least as high as the cure temperature of the resin in the skins 14 to cure the skins 14 and thereby form the structure 10. After the structure 10 has been cured and cooled, the composite structure 10 is removed from the mandrel 20 and the tiedown plies 18 are trimmed to remove the film adhesive 19 and the extending portions of the tiedown plies 19 from the finished structure 10.

Referring now to FIG. 1, there is shown a preform 100 for forming a composite structure 110 according to one embodiment of the present invention and, in particular, a honeycomb core sandwich panel having a core 112 with outer facesheets or skins 114 on opposite sides thereof. One finished composite structure 110 according to the present invention is illustrated in FIG. 2, but it is understood that composite structures having various structures and configurations can similarly be formed without departing from the scope of the present invention. The composite structures 110 formed according to the present invention can be used for a variety of applications, including aerospace structures, automobiles, other vehicles, and other applications where high stiffness-to-weight and strength-to-weight ratios are desirable.

The skins 114 of the composite structure 110 comprise resinous composite laminates, i.e., laminates formed of layers of fiber-reinforced organic matrix resin, which are in a cured and consolidated form in the finished skins 114. The skins 114 can be provided as prepreg sheets in the preform 100 or as reinforcement sheets with separate resin films therebetween. The core 112 can be paper, synthetic paper, metal, composite, or the like, as appropriate for a particular application. At least one tiedown ply 116, 116a is disposed between the core 112 and the outermost layer of each laminate skin 114. An unsupported film adhesive 118, a barrier film 120, and a scrim-supported film adhesive 122 can also be provided between the skin 114 and the core 112 to keep resin out of hollow cells that are defined by the core 112. The tiedown plies 116, 116a extend from the preform 100 for securing the preform 100 during manufacture, e.g., to prevent core crush that can otherwise result when the preform 100 is subjected to pressure and heat associated with curing. Further, one or more of the tiedown plies 116a can contact the core 112, for example, on a chamfered portion 113 of the core 112, where the thickness of the core 112 tapers to an edge, as shown in FIG. 1.

For example, the laminated skins 114 can be formed of RIGIDITE® 5250-4-W-IM7-GP-CSW, RIGIDITE® 5250-4-W-IM7-GP-CSX, or RIGIDITE® 5250-4-W-IM7-GP-PW prepreg from Cytec Engineered Materials, Inc. (Cytec). Alternatively, the laminated skins 114 can be provided as laminar sheets with a resin disposed separately therewith. The film adhesive 122 can be 0.015 psf METLBOND® 2550U adhesive, also available from Cytec. The film adhesive 118 provides additional resin to promote bonding between the laminate skin 114 and barrier film 120. The barrier film 120 can be a 0.001 inch thick, bondable grade, surface-treated KAPTON® polyimide barrier film capable of withstanding the cure cycle to provide a resin-impermeable membrane between the skin 114 and the core 112. The scrim-supported film adhesive 122 can be 0.06 psf METLBOND® 2550G adhesive, available from Cytec, with a fiberglass scrim such as "Style 104" fiber cloth. The scrim-supported film adhesive 122 prevents the barrier film 120 from bulging into the cells of the core 112, thereby retaining the resin in the laminate skins 114 so that the cured skin thickness is maximized, and achieving maximum performance for minimum weight of the composite structures. The film adhesive 118, barrier film 120, and film adhesive 122 can be purchased as a single item from Cytec as METLBOND® 2550B-0.082 36. Preferably, the film adhesive 118 is tailored to achieve an adequate bond between the skin 114 and barrier film 120. The supported film adhesive 118 and barrier film layers 120 in the sandwich structure also function as corrosion barriers between the skin 114 and core 112 in the case where the core 112 is metal, such as aluminum, and the skin 114 includes a galvanically dissimilar material, such as carbon fiber.

Additional information concerning composite structures is presented in a technical paper by Hartz, et al., "Development of a Bismaleimade/Carbon Honeycomb Sandwich Structure," SAMPE, March, 1996, which is incorporated herein by reference. This paper describes the use of a barrier film, tiedown plies, and adhesion of layers in a composite structure.

The honeycomb core 112 can be a HRP Fiberglass Reinforced Phenolic honeycomb available from Hexcel. The core 112 can be preconditioned to eliminate volatile evolution during curing. For example, the core 112 can be heated to about 235° C. prior to laying up the preform 100. Such preconditioning can eliminate disbanding of the core 112 and laminate skins 114 caused by outgassing of the core 112 during curing, especially for phenolic cores 112.

The tiedown plies 116, 116a typically are prepregs of carbon fiber impregnated with bismaleimide thermoset resin, although the present invention also applies to other resin systems. For example, tows can be used instead of the prepreg plies. As shown in FIG. 2, the tiedown plies 116, 116a can be laminar sheets that extend continuously or partially through the preform 100 to anchor the preform 100 during manufacture. For example, the tiedown ply 116a is a narrow, peripheral strip that contacts the core 112 along at least part of the chamfered portion 113 for about 1 inch overlap with the core 112 and extends outward from the core 112 beyond a net trim line 124, i.e., the line along which the tiedown plies 116, 116a are trimmed from the composite structure 110. Thus, the tiedown ply 116a forms a peripheral frame around the edge of the composite structure 110 and allows an adhesive interface between the core 112 and the skins 114. The tiedown ply 116a can be disposed against either side of the core 112 and contacts the core 112 beneath the adhesives 118, 122 and barrier film 120, which bond the laminate skin 114 to the core 112. Tiedown plies are also described in U.S. Pat. No. 5,685,940.

Each of the tiedown plies 116, 116a can have about the same outer dimensions so that the plies 116, 116a extend to about a common edge beyond the net trim line 124. Alternatively, each tiedown ply 116, 116a can extend successively outward beyond the underlying plies 116, 116a. A film adhesive 126 is disposed between the tiedown plies 116, 116a to retain the plies 116, 116a to one another and prevent movement of the plies 116, 116a relative to the other plies 116, 116a when pressure is applied during the autoclave curing cycle. The film adhesive 126 can be disposed outside the net trim line 124 and removed from the finished composite structure 110. The film adhesive 126 can have a relatively low cure temperature, e.g., about 121° C. for BMI structures. Thus, the film adhesive 126 is cured at a temperature that is about 38° to 66° C. below the cure temperature of the resin in the laminate skins 114 so that the tiedown plies 116, 116a are adhered before the autoclave pressure is increased for curing of the skins 114.

During manufacture, the preform 100 is assembled, or layed-up, on a mandrel 130, shown individually in FIGS. 3 and 4. The mandrel 130 defines a layup surface 132 for receiving the preform 100 and, hence, the composite structure 110. The layup surface 132 defines an inner portion 134 and a grip feature 140. The inner portion 134 generally corresponds to a desired contour of the composite structure 110. For example, the flat layup surface 132 illustrated in FIGS. 3 and 4 can be used to manufacture composite structures 110 that are generally flat on at least one side. Alternatively, the layup surface 132 can be contoured to define simple or complex geometric shapes including non-planar angles, curves, and the like. As shown in FIG. 4, the grip feature 140 can be a groove disposed in the layup surface 132 that defines a boundary between the inner portion 134 and an outer peripheral portion 136 of the mandrel 130. The outer peripheral portion 136, which extends outwardly from the inner portion 134, can be used to receive and/or secure the edges of the tiedown plies 116, 116a outward of the net trim line 124, i.e., a trim portion of the preform 100 that is removed after curing to form the composite structure 110 to the desired shape and dimensions.

As shown in FIG. 3, the grip feature 140 is a groove that extends continuously around the entire inner portion 134 of the layup surface 132, though in other embodiments, the grip feature 140 can be formed of multiple distinct grooves, for example, four linear grooves disposed parallel to the edges of the mandrel 130 that are not joined at the corners of the mandrel 130. Further, the grip feature 140 can define an outer perimeter of the composite structure 110, disposed outside the net trim line 124 and corresponding to the desired shape of the composite structure 110. The inner portion 134 of the layup surface 132 is shown to be generally rectangular-shaped in FIG. 4, but other shapes can be defined by the grip feature 140 and the inner portion 134, including complex shapes having curves or angles at the periphery.

The grip feature 140 is configured to retain the composite structure 110 in a predetermined configuration during manufacture. As shown in FIG. 4, the grip feature 140 defines a retaining surface 142 proximate to the inner portion 134 of the layup surface 132. The retaining surface 142 is generally perpendicular to the layup surface 132 so that the retaining surface 142 and the layup surface 132 define an edge 144 therebetween. The retaining surface 142 and the edge 144 are configured to engage the composite structure 110. In particular, the feature 140 is configured to receive a film adhesive 146 or other adhesive material, which is secured to the mandrel 130 in the feature 140 and thereby secures the tiedown plies 116, 116a to the mandrel 130. The feature 140 can also partially receive one or more of the tiedown plies 116, 116a therein. The film adhesive 146 can be the same as the adhesive 126 between the tiedown plies 116, 116a. Preferably, the film adhesive 146 also has a cure temperature less than the cure temperature of the resin of the skins 114 so that the film adhesive 146 can be cured before the skins 114, thereby securing the plies 116, 116a to the mandrel 130. For example, the film adhesive 146 can have a cure temperature that is about 38° to 66° C. below the cure temperature of the resin in the laminate skins 114. Preferably, the difference in temperature between the cure temperature of the film adhesive 146 and the resin in the laminate skins 144 is such that the adhesive 146 can gel or vitrify before the resin in the laminate skins 144 becomes substantially cured. The bonds provided by the cured adhesives 126, 146 are sufficiently strong so that the adhesive 146 retains one of the tiedown plies 116 to the mandrel 130 and the adhesive 126 retains the remaining tiedown plies 116, 116a to the ply 116 attached to the mandrel 130. Thus, the film adhesive 146 retains the tiedown plies 116, 116a while the preform 100 is cured, reducing movement of the tiedown plies 116, 116a and skins 114. The present invention therefore provides an apparatus and method for reducing wrinkling of the skins 114, crushing of the core 112, and/or other undesirable movement of the preform 100 during curing.

A bottom portion 148 of the feature 140 is angled relative to the retaining surface 142, e.g., parallel to the layup surface 132 of the inner portion 134. The feature 140 can also define a tapered portion 150 that is angled from the bottom portion 148 to the surface of the peripheral portion 136. The angle of the tapered portion 150 can facilitate the removal of the composite structure 110 from the mandrel 130 and the film adhesive 146 from the feature 140 after curing. Alternatively, the bottom portion 148 can taper to the surface of the outer peripheral portion 136, or the angled portion 150 can be perpendicular to the bottom and/or outer peripheral portions 148, 136.

In other embodiments of the present invention, the grip feature 140 can define a variety of other cross-sectional profiles, including rounded, square, or triangular grooves, and the like. Further, the grip feature 140 can define profiles other than grooves. For example, FIG. 5 illustrates another mandrel 130 with a step-like grip feature 140. As shown in FIG. 5, the bottom 148 of the feature 140 can extend from the retaining surface 142 to a periphery 152 of the mandrel 130, i.e., so that the mandrel 130 does not define an peripheral portion extending outward from the feature 140. In addition, although the retaining surface 142 is shown to be perpendicular to the layup surface 132, the retaining surface 142 can alternatively define an acute or obtuse angle relative to the layup surface 132, i.e., the retaining surface 142 can be angled toward or away from the outer peripheral portion 136. Preferably, the retaining surface 142 is sufficiently angled relative to layup surface 132 so that the retaining surface 142 is configured to engage the composite structure 110.

The grip feature 140 can be formed in a variety of sizes. For example, the feature 140 can define a depth of between about 0.070 inch and 0.5 inch, such as between about 0.100 inch and 0.250 inch. In one embodiment, the feature 140 has a depth that is about 0.0625 inch less than the thickness of the mandrel 130, which is typically at least about 0.25 inch.

The width of the feature 140, as measured between the inner portion 134 and the outer portion 136 or the periphery 152 of the mandrel 130, can also vary. For example, the width of each of the bottom and tapered portions 148, 150 can be at least about 0.5 inch, and the width of the feature 140 can be about 1 inch.

The operations for retaining a composite structure during manufacture according to one embodiment of the present invention are illustrated in FIG. 5. It is understood that additional operations can be performed and one or more of the illustrated operations can be omitted without departing from the scope of the present invention. In Block 210, a mandrel is provided. The mandrel defines a layup surface for receiving the composite structure thereon, and the layup surface defines an inner portion and a grip feature. The grip feature can be formed to extend continuously around the inner portion, and can define a retaining surface that forms an edge with the inner portion of the layup surface.

Next, a composite preform in the shape of the composite structure is assembled on the layup surface of the mandrel. See Block 212. The preform has at least one resinous composite laminate and at least two tiedown plies. For example, the tiedown plies can include a bismaleimide matrix resin. The preform can also include a barrier film of a bondable grade polyimide adjacent the laminate. For example, the preform can include a honeycomb core, and an adhesive can be disposed between the barrier film and the core. Further, a film adhesive layer can be disposed between the barrier film and the laminate. In addition, a supporting scrim can be provided between the barrier film adhesive and the core to prevent sagging of the barrier film into the cells of the honeycomb core. One or more of the tiedown plies can contact the core between the adhesive and core.

At least one of the tiedown plies is adhered to the mandrel with the film adhesive applied at the grip feature so that the tiedown ply is engaged by the grip feature and the grip feature retains the composite structure in a predetermined configuration. See Block 214. The preform is cured, for example, in an autoclave, to form the composite structure. That is, the preform is subjected to a cycle of elevated temperature and pressure to consolidate and cure resin in the laminate while bonding or otherwise adhering the cured laminate to the honeycomb core. The film adhesive is characterized by a cure temperature lower than a cure temperature of the resin of the laminate. Thus, the film adhesive can be cured before the resin of the composite laminate is melted. See Block 216. For example, the composite preform is heated to a first temperature that is between the cure temperature of the film adhesive and the cure temperature of the resin in the composite laminate, e.g., about 135° C., and held for a first duration, e.g., about 2 hours. The preform is then further heated to a second temperature that is at least as high as the cure temperature of the resin, e.g., 191° C., and held for a second duration, e.g., between about 6 and 12 hours. The preform can also be further heated to complete curing.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. An apparatus for layup of a composite structure of a honeycomb core sandwich panel having a generally flat side, the apparatus comprising:
   a tool defining a generally planar layup surface for receiving the composite structure thereon, the layup surface defining an inner portion generally corresponding to a desired contour of the side of the composite structure and a grip feature disposed in the layup surface and extending at least partially around the inner portion,
   wherein the grip feature is a grip groove disposed in the layup surface, the grip groove defining a retaining surface configured to retain the composite structure in a predetermined configuration during manufacture, and the grip groove having a tapering width such that a width of the grip groove at a top of the groove is greater than a width of the grip groove at the bottom of the groove.

2. An apparatus according to claim 1 wherein the grip feature extends continuously around the inner portion of the layup surface.

3. An apparatus according to claim 1 wherein the retaining surface is generally perpendicular to the layup surface and defines an edge with the layup surface, the retaining surface and the edge configured to engage the composite structure.

4. An apparatus according to claim 1 wherein the grip feature defines a bottom portion extending outward from the retaining surface to a periphery of the tool.

5. An apparatus according to claim 1 wherein the grip feature defines a depth of between about 0.1 inch and 0.5 inch.

6. An apparatus according to claim 1 wherein the grip feature defines a boundary of the inner portion having a shape generally corresponding to the desired shape of the composite structure.

7. An apparatus according to claim 1 wherein the layup surface defines an outer peripheral portion outward of the inner portion and wherein the grip feature is a grip groove disposed in the layup surface and defining a boundary between the inner portion and the outer peripheral portion of the layup surface.

8. An apparatus according to claim 7 wherein the grip groove defines a tapered portion extending at least partially between the retaining surface and the outer peripheral portion.

9. A method for retaining a composite structure of a honeycomb core sandwich panel having a generally flat side during manufacture thereof, the method comprising:
   providing a tool having a generally planar layup surface for receiving the composite structure thereon, the layup surface having an inner portion and a grip feature defining a retaining surface extending at least partially around the inner portion;
   assembling on the layup surface of the tool a composite preform in the shape of the composite structure, the preform having at least one resinous laminate and at least two tiedown plies; and
   adhering at least one of the tiedown plies to the tool with a film adhesive applied at the grip feature such that the tiedown ply is retained by the grip feature in a predetermined configuration,
   wherein the film adhesive is characterized by a cure temperature lower than a cure temperature of the resin of the laminate.

10. A method according to claim 9 wherein said providing step comprises forming the grip feature to extend continuously around the inner portion of the layup surface.

11. A method according to claim 9 wherein said providing step comprises forming the retaining surface generally perpendicular to the layup surface to define an edge with the inner portion of the layup surface, such that the retaining surface and the edge are configured to retain the composite structure.

12. A method according to claim 9 wherein said providing step comprises forming the grip feature to define a depth of between about 0.1 inch and 0.5 inch.

13. A method according to claim 9 wherein said providing step comprises forming the layup surface to define an outer peripheral portion outward of the inner portion and forming the grip feature as a grip groove disposed in the layup surface and defining a boundary between the inner portion and the outer peripheral portion of the layup surface.

14. A method according to claim 9 wherein said assembling step comprises providing the laminate including bismaleimide matrix resin.

15. A method according to claim 9 wherein said assembling step comprises providing a honeycomb core.

16. A method according to claim 15 wherein said assembling step comprises providing a tiedown ply in contact with the core.

17. A method according to claim 9 further comprising providing a film adhesive between the tiedown plies.

18. A method according to claim 9 further comprising heating the composite preform to a first temperature between the cure temperature of the film adhesive and the cure temperature of the resin in the laminate, and subsequently heating the composite preform to a temperature at least as high as the cure temperature of the resin, such that the film adhesive is cured before the resin is melted.

19. A method according to claim 9 further comprising trimming the preform along a trim line inward of the grip feature to form the composite structure.

20. A method according to claim 9 wherein said providing step comprises providing the grip feature as a grip groove disposed in the layup surface, the grip groove defining a retaining surface configured to retain the composite structure in a predetermined configuration during manufacture, and the grip groove having a tapering width such that a width of the grip groove at a top of the groove is greater than a width of the grip groove at the bottom of the groove.

21. A method for retaining a composite structure during manufacture thereof, the method comprising:
   providing a tool having a layup surface for receiving the composite structure thereon, the layup surface having an inner portion and a grip feature defining a retaining surface extending at least partially around the inner portion;
   assembling on the layup surface of the tool a composite preform in the shape of the composite structure, the preform having at least one resinous laminate and at least two tiedown plies, such that the grip feature receives at least one of the tiedown plies;
   adhering at least one of the tiedown plies to the grip feature such that the tiedown ply is retained by the grip feature in a predetermined configuration;
   curing the resin of the laminate to form the composite structure; and
   after said curing step, removing the composite structure from the layup surface.

22. A method according to claim 21 wherein said providing step comprises forming the grip feature to extend continuously around the inner portion of the layup surface.

23. A method according to claim 21 wherein said providing step comprises forming the retaining surface generally perpendicular to the layup surface to define an edge with the inner portion of the layup surface, such that the retaining surface and the edge are configured to retain the composite structure.

24. A method according to claim 21 wherein said providing step comprises forming the grip feature to define a depth of between about 0.1 inch and 0.5 inch.

25. A method according to claim 21 wherein said providing step comprises forming the layup surface to define an outer peripheral portion outward of the inner portion and forming the grip feature as a grip groove disposed in the layup surface and defining a boundary between the inner portion and the outer peripheral portion of the layup surface.

26. A method according to claim 21 wherein said assembling step comprises providing the laminate including bismaleimide matrix resin.

27. A method according to claim 21 wherein said assembling step comprises providing a honeycomb core.

28. A method according to claim 27 wherein said assembling step comprises providing a tiedown ply in contact with the core.

29. A method according to claim 21 further comprising providing a film adhesive between the tiedown plies.

30. A method according to claim 21 wherein said adhering step comprises adhering the at least one of the tiedown plies to the tool with a film adhesive applied at the grip feature, wherein the film adhesive is characterized by a cure temperature lower than a cure temperature of the resin of the laminate.

31. A method according to claim 30 wherein said curing step comprises heating the composite preform to a first temperature between the cure temperature of the film adhesive and the cure temperature of the resin in the laminate, and subsequently heating the composite preform to a temperature at least as high as the cure temperature of the resin, such that the film adhesive is cured before the resin is melted.

32. A method according to claim 21 further comprising trimming the preform along a trim line inward of the grip feature to form the composite structure.

33. A method according to claim 21 wherein said providing step comprises providing the grip feature as a grip groove disposed in the layup surface, the grip groove defining a retaining surface configured to retain the composite structure in a predetermined configuration during manufacture, and the grip groove having a tapering width such that a width of the grip groove at a top of the groove is greater than a width of the grip groove at the bottom of the groove.

34. An apparatus for layup of a composite structure, the apparatus comprising:
   a tool for receiving the composite structure thereon, the layup surface defining an inner portion generally corresponding to a desired contour of the side of the composite structure and a grip feature disposed in the layup surface and extending at least partially around the inner portion,
   wherein the grip feature is a grip groove disposed in the layup surface, the grip groove defining a retaining surface configured to retain the composite structure in a predetermined configuration during manufacture, and the grip groove having a tapering width such that a width of the grip groove at a top of the groove is greater than a width of the grip groove at the bottom of the groove.

35. A method for retaining a composite structure during manufacture thereof, the method comprising:
   providing a tool having a layup surface for receiving the composite structure thereon, the layup surface having an inner portion and a grip feature defining a retaining surface extending at least partially around the inner portion;
   assembling on the layup surface of the tool a composite preform in the shape of the composite structure, the preform having at least one resinous laminate and at least one tiedown ply;
   adhering the at least one tiedown ply to the grip feature such that the tiedown ply is retained by the grip feature in a predetermined configuration;
   curing the resin of the laminate to form the composite structure; and after said curing step, removing the composite structure from the layup surface.

* * * * *